United States Patent
Turner

[19]

[11] Patent Number: 6,164,663
[45] Date of Patent: Dec. 26, 2000

[54] BIDIRECTIONAL METAL TO METAL SEAL

[75] Inventor: Edwin C. Turner, Houston, Tex.

[73] Assignee: Kvaetner Dilfield Products, Houston, Tex.

[21] Appl. No.: 09/196,804

[22] Filed: Nov. 20, 1998

[51] Int. Cl.[7] .................................................. F16L 17/35
[52] U.S. Cl. ...................... 277/602; 277/928; 277/603; 277/647
[58] Field of Search ..................... 277/602, 603, 277/607, 616, 626, 630, 647, 648, 928

[56] References Cited

U.S. PATENT DOCUMENTS

| | | | |
|---|---|---|---|
| 3,223,426 | 12/1965 | Reid | 277/928 |
| 3,620,556 | 11/1971 | Paddington | 277/179 |
| 3,680,874 | 8/1972 | Schwarz | 277/153 |
| 3,768,819 | 10/1973 | Burkert | 277/206 |
| 4,199,157 | 4/1980 | Skinner et al. | 277/190 |
| 4,254,793 | 3/1981 | Scaramucci | 277/29 |
| 5,860,680 | 1/1999 | Drijver et al. | 277/647 |
| 5,984,316 | 11/1999 | Balsells | 277/651 |
| 5,997,003 | 12/1999 | Turner . | |

Primary Examiner—Anthony Knight
Assistant Examiner—Mark Williams
Attorney, Agent, or Firm—Wendy K. Buskop; Buskop Law Group

[57] ABSTRACT

A bidirectional metal-to-metal seal of material composition with low modulus of elasticity and yield strength which is gall resistant and designed to seal against fluid pressure in the annulus between concentric cylindrical members. The seal comprises an annular body of U-shape and radial cross section with an annular base and a pair of coaxial sealing lips integral therewith. An annular bridge of similar composition is inserted in the gap between the sealing lips and fluid pressure in the annulus is cemented to the gap by recesses in the inner wall of one of the sealing lips. The exterior surface of the one lip is provided with a pair of axially spaced circumferential flanges, the radial extremities of which provide annular sealing surfaces. The exterior of the other lip is provided with a central circumferential cylindrical sealing surface between adjoining tapered surfaces, diverging from the respective ends of said other lip to the central cylindrical sealing surface and the upper one of which is adapted to engage a similarly tapered shoulder on the member with which it is to seal.

15 Claims, 4 Drawing Sheets

BIDIRECTIONAL METAL TO METAL SEAL

FIELD OF THE INVENTION

The present invention relates to a bidirectional metal to metal seal for fluids using a flexible bridge for sealing loads from opposite directions parallel to the center line of the seal, where the seal is disposed in an annular space between facing cylindrical surfaces, such as between a wellhead and a tubing hanger suspended therein, and more particularly, where the seal uses at least three non-aligned sealing surfaces and the seal is in an annular space between facing cylindrical surfaces of metallic members where one member is disposed concentrically with the other.

BACKGROUND OF THE INVENTION

Metal-to-metal seals are widely used for sealing against fluid pressure in the spacing between the facing surfaces of one member disposed within the tubular bore of another. Such prior art metal-to-metal seals, and particularly those of annular configuration which are U-shaped in radial cross section, generally have relatively low tolerance with respect to rough finishes on surfaces with which they are to seal and generally require pre-loading. They are also characterized by a high modulus of elasticity and thus require relatively large actuating loads since the actuating load is required to exceed the yield strength of the seal material so that it will become sufficiently plastic to flow into the irregularities of the roughened surface with which it is to seal. Furthermore, the prior art seals are typically unidirectional and require relatively long actuating strokes since they are characteristically provided with relatively long "U" legs (seal lips) as a means of increasing their flexibility but which also make it difficult to achieve the necessary plasticity for an effective seal.

SUMMARY OF THE INVENTION

The invention is a bidirectional metal-to-metal seal for sealing against fluid pressure in an annular space between facing cylindrical surfaces of metallic members disposed concentrically one within the other using a flexible bridge which has at least three sealing surfaces and further is capable of receiving loads affecting at least three sealing surfaces, one disposed between wherein the loads are directed at the seal in alternatively opposite directions which are parallel to the centerline of the seal. The seal comprises an annular body member having a continuous ring base portion and a pair of radially spaced annular sealing lip members integrally joined to the base portion and coaxial therewith. One of the sealing lip members is provided on its exterior with a pair of frusto-conical tapered surfaces and a cylindrical sealing surface area therebetween with the central sealing surface equidistant from the top of the continuous ring base portion and the free end of said sealing lip member.

The second sealing lip member is provided on its external surface with a pair of rounded flanges extending circumferentially thereabout in axially spaced relation to one another at opposite ends of the lip member and with the radial extremities of the flanges providing uniform sealing surfaces which are in different radial planes with respect to the cylindrical sealing surface of the first sealing lip member, the center of which is in an intermediate radial plane. The inner surface of the second sealing lip has an annular groove recess and cylindrical surface portions on both sides of the groove. The cylindrical surface portion which extends from the free end of the second sealing lip is provided with a notch which extends the axial length of the cylindrical surface portion and communicates fluid pressure in the annulus to be sealed with the grooved recess and the annular gap formed by the beveled surface of the bridge and the sealing lip members whereby the fluid communication to the interior of the U-shape body member distinguishes the seal and its performance from a conventional "solid" seal. The second sealing lip member has sealing surfaces on each of the flanges which are not aligned, not in the same plane either with each other or with the cylindrical center portion of the sealing means which is disposed between them. This non-alignment of pressure surfaces is a unique feature of the present invention and enables the bidirectionality, that is the ability to seal with loads coming from opposite directions, both of which are parallel to the centerline of the seal.

DETAILED DESCRIPTION OF THE INVENTION

Figure 1:
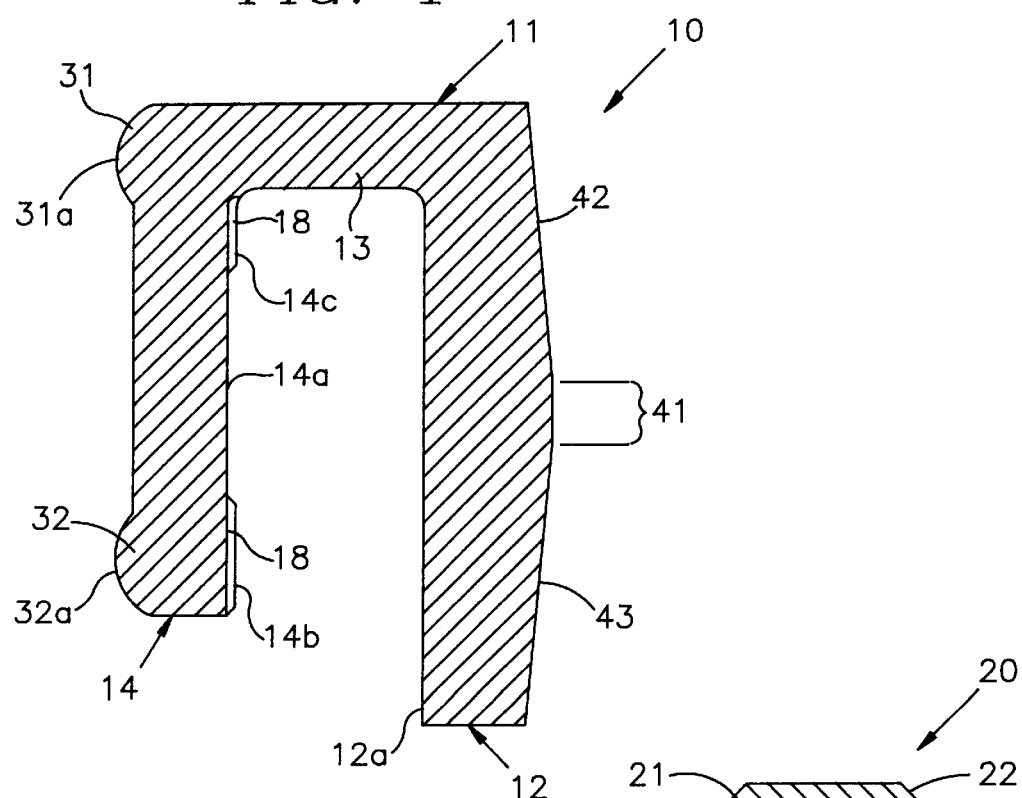
FIG. 1 a radial cross section of the bidirectional annular metal-to-metal seal of the invention.
Figure 2:
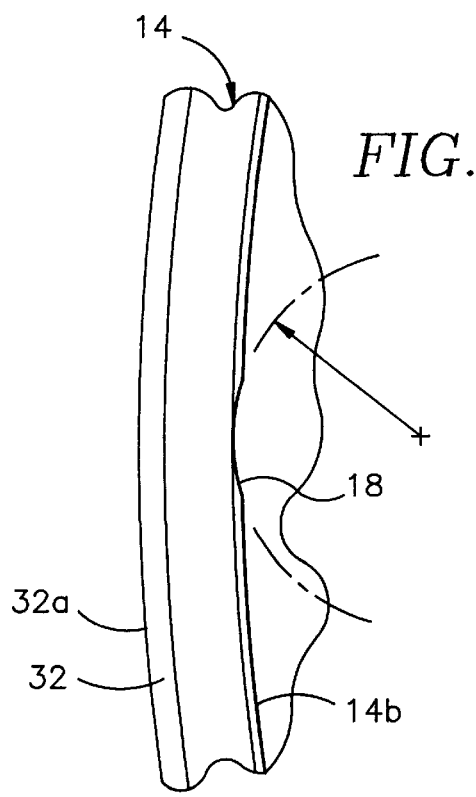
FIG. 2 is a fragmentary end view of one of the annular lip members of the bidirectional seal of the invention.

Referring more particularly to the drawings, there is shown in FIG. 1 a radial cross section of the bidirectional metallic sealing ring 10 of the present invention. The seal 10 includes an annular metallic sealing member 11 which comprises a pair of lip members in the form of concentric rings 12,14 in radially spaced relation to one another and integrally joined at their upper end by an annular transverse base portions preferred embodiment of the invention the axial dimension of the inner lip ring 12 is greater than the axial dimension of the outer lip ring 14 so that the radial cross section of the sealing member 11 as shown in FIG. 1, is of generally "U" shape with one leg 14 shorter than the other leg 12.

The lip ring 14 is provided with a circumferential groove in its inner surface so that its inner surface comprises a cylindrical central recessed portion 14a and cylindrical end portions 14b, 14c. The surface portion 14b is provided with at least one notch 18 which extends axially from the free end of the lip ring 14 through the length thereof and communicates with the recess formed by the recessed surface 14a.

Figure 3:
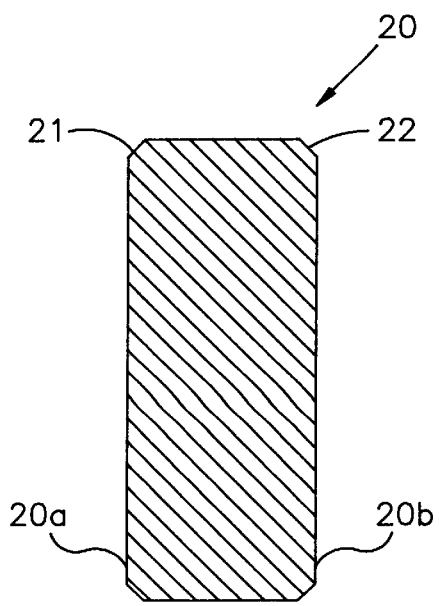
FIG. 3 is a radial cross section of the annular insert which is installed as a flexible bridge between the annular lips of the bidirectional seal of the invention.

The seal 10 includes an annular bridge member 20 which is flexible and capable of being plasticized in the form of a metal ring shown in radial cross section in FIG. 3, with cylindrical side walls 20a, 20b. The bridge member 20 is seated snugly between the rings 12 and 14 with its sidewall 20*b*, engaging the facing cylindrical surface 12*a* of the ring 12 and its sidewall 20*a* engaging the facing cylindrical surfaces 14*b* and 14*c* of the ring 14. At it top end which engages the underside of the transverse base portion 13, the bridge member 20 is also provided with annular beveled end surfaces 21,22 which are in spaced relation to the inner surfaces 12*a* and 14*c* of the rings 12 and 14, respectively.

The notch 18 in the surface 14*b* provides a passage for fluid communication between the exterior of the seal 10 and the annular groove provided by the recessed surface 14*a*.

In addition, the outer wall surface of the lip ring 14, as viewed in its U-shape, is provided with circumferential rounded flanges 31,32 at its respective opposite ends and the outer wall surface of the ring 12 is provided with a central portion 41 of circular cylinder configuration and frusto-conical surface portions 42 and 43 with 6° taper which extend from the upper end and lower end respectively, of the lip ring 12 in an outward direction to the cylindrical center portion 41. The radial extremities 31*a*, 32*a* constitute the sealing surfaces of the lip ring 14 and the surface 41 constitutes the sealing surface of the lip ring 12 and these radial extremities are capable of sustaining loads which occur from opposite directions and which are parallel to the centerline of the seal. These sealing surfaces are provided with smooth finishes and are "gall resistant" in that they do not tend to scratch or trade material with the surfaces they engage based on the direction of the load.

The seal 10 of the invention comprising the sealing component 11 and bridge member 20 is fabricated of metal having a relatively low modulus of elasticity and yield strength as compared to conventional metal-to-metal seals. It is specifically designed to flex and provide an indirect load path which enables the bridge to provide contact and effective fluid pressure sealing on the sealing surfaces. The bridge is contemplated to provide strength in sealing and plasticity, so when the load on the seal is provided from a first direction the seal can resume its original shape and then flex again to provide effective fluid sealing when the load on the seal is changed and provided from a second direction, both loads though being parallel to the centerline of the seal. This unique bidirectional seal can seal against fluid pressure when installed in an annular space between the facing cylindrical surfaces of metallic members such as between a wellhead and a tubing hanger suspended in the wellhead bore. In a typical application the seal 10 is installed in concentric coaxial relation to the metallic members between which it is to seal. Because of the notch or notches 18, fluid pressure in the annulus below the seals 10A, 10B is communicated to the gap between the facing walls of the bridge 20 and the ring 14 such that the seal 10 of the invention is distinguished from a gasket and performs differently therefrom. Further, unlike a "solid" seal which requires a radial pre-loading, the seal 10 requires less preloading.

Figure 4:
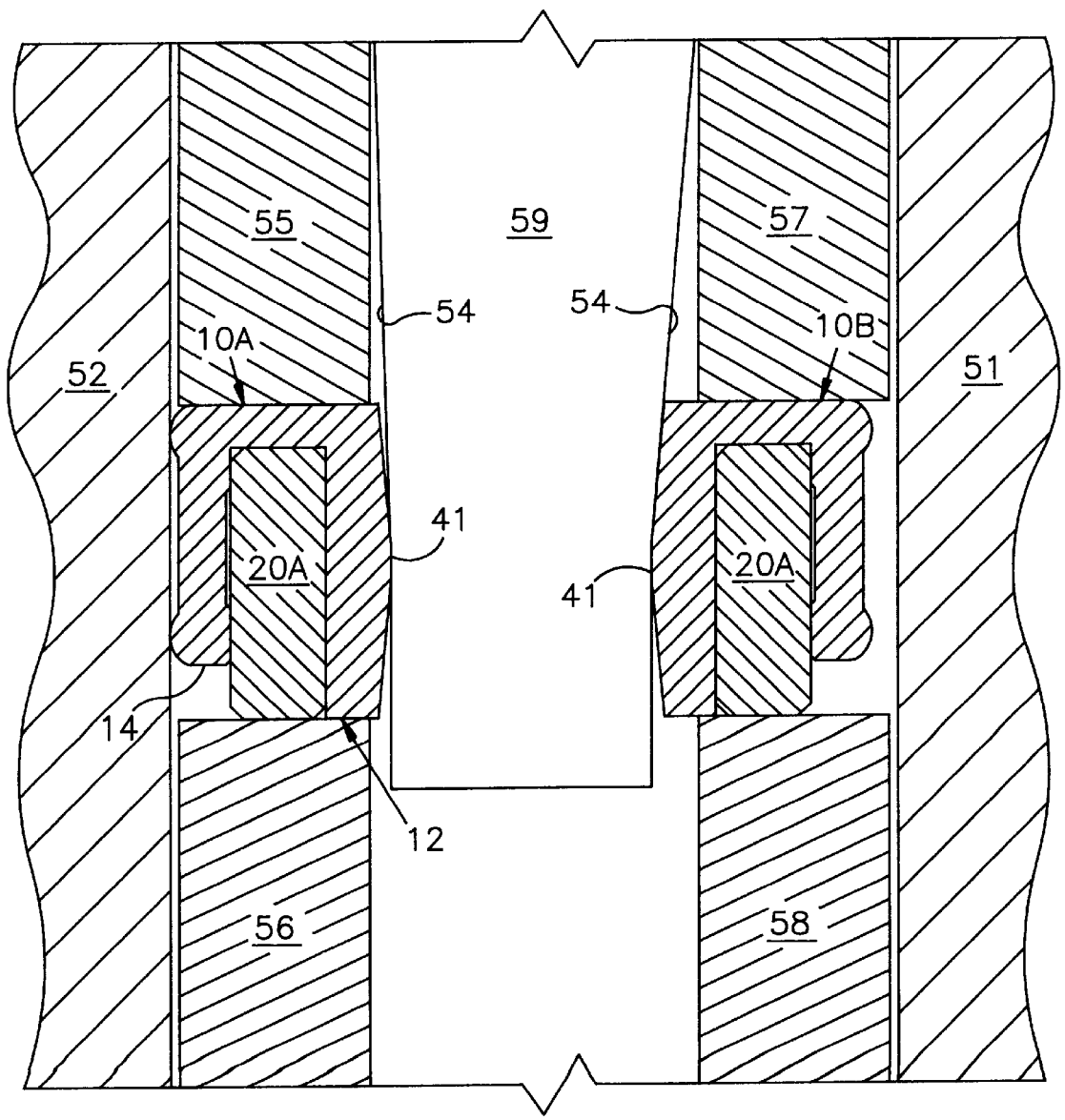
FIG. 4 is a fragmentary view in longitudinal section of a pair of concentric coaxially disposed members wherein a pair of seals of the invention are disposed in the annulus therebetween and in concentric radially spaced relation to one another.

With reference to FIG. 4, a pair of seals, 10A and 10B, in accordance with the invention, are shown mounted in concentric coaxial and radial spaced relation to one another in an annulus between two metallic members 51 and 52, such as a wellhead 51 and tubing hanger 52 suspended in the wellhead bore. The seal 10A, coaxial and concentric about the axis (not shown) of the member 52, is mounted in the annulus on an annular support ring 56 with a retainer ring 55 superimposed thereon. The seal 10B, which, with respect to the axis of member 52, is outside the seal 10A, is similarly supported between a support ring 58 and a retainer ring 57. The rings 56 and 55 are also in coaxial relation to one another and each is fixed in the annulus as by a threaded connection (not shown) or by other appropriate means to the member 52. Rings 57 and 58 are similarly connected to the member 51.

As also seen in FIG. 4, the ring 56 is positioned directly below the seal ring 10A in contact with the lower annular surface of the bridge 20A. Similarly, the ring 58 is positioned below the seal ring 10B in contact with the lower annular surface of the bridge 20B. It is further to be noted that the rings 55–58, the wedge member 59, and the seals 10A, 10B are all in coaxial concentric relation to one another and to the spaced metallic members 51 and 52 between which a fluid tight seal is to be provided.

With reference to FIG. 4, it is shown that the seals 10A and 10B are separated by an annular wedge member 59, the side walls of which are in abutting engagement with the respective seal lips, "legs" 12 of each of the seals 10A, 10B. The wedge member 59 is provided with an external annular surface comprising a cylindrical surface portion 59*a*, an adjoining taper surface 59*b* of 3° taper, which extends axially to an adjoining downward facing frusto-conical shoulder 59*c* with a 6° taper corresponding to the tapered surfaces 42, 43 of the seal lips 12. The internal annular surface of the wedge 59 comprises a cylindrical surface portion 59*d* in radial spaced relation to the surface 59*b*, and an adjoining surface 59*e* of 3° taper which extends axially to a shoulder 59*f* with 6° taper such that the tapered surfaces 59*b* and 59*e* are in radially spaced relationship to one another as are the tapered surfaces 59*c* and 59*f*.

Figure 5:
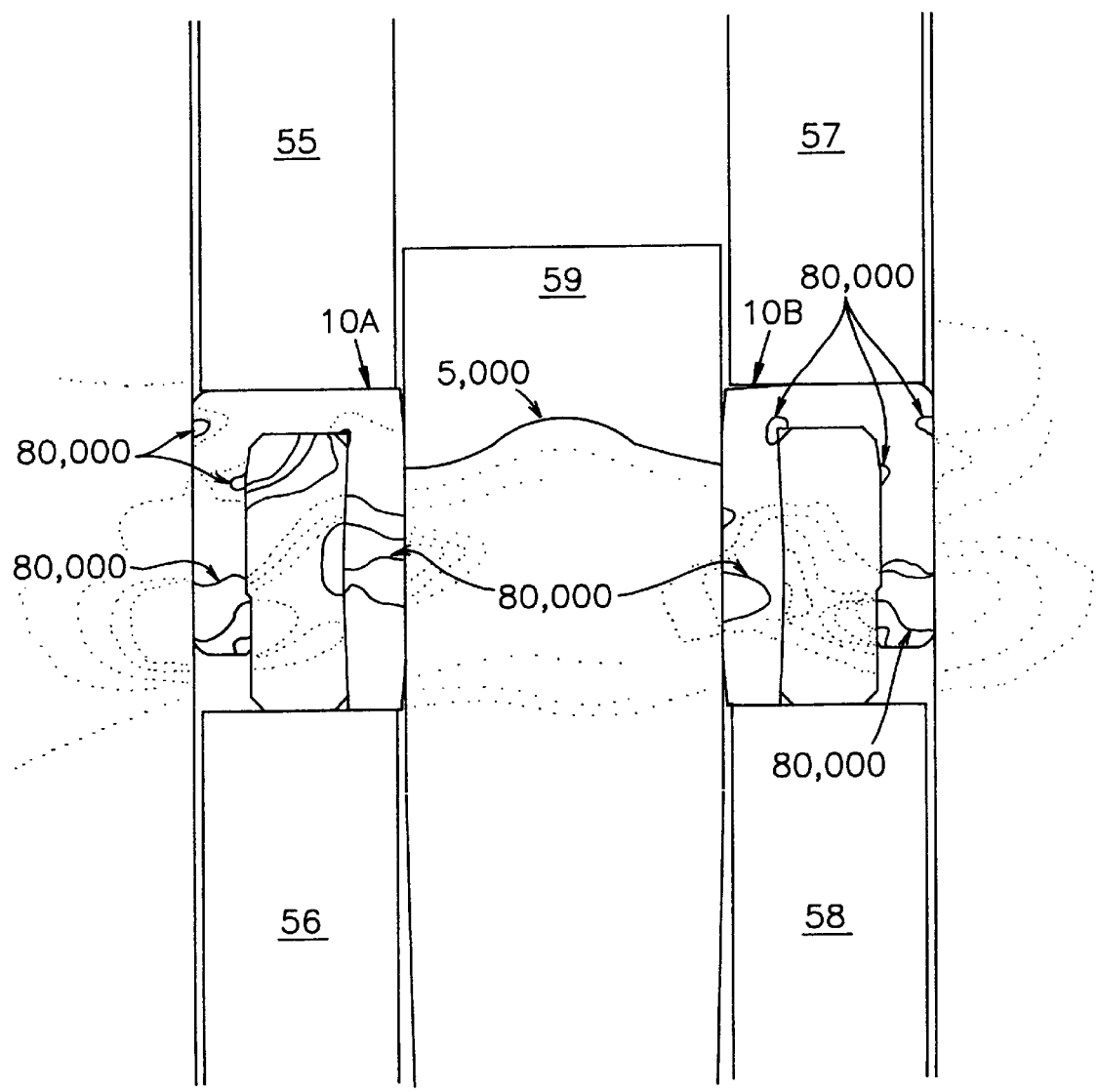
FIG. 5 is a diagram showing the location and magnitude of radial contract stresses imposed on the pair of seals and adjacent sealing structures shown in FIG. 4 after the seals have been energized.

With the seals in unenergized or "unloaded" position as shown in FIG. 4, an actuating force parallel to the centerline of the seal may then be applied to the seals 10A, 10B as by a downward movement of the wedge ring 59 induced by an appropriate actuator means (not shown) whereby the sealing surfaces 31*a*, 32*a* of the seals move into sealing engagement with the respective annulus defining members 51, 52 as shown in FIG. 5 and the bridge flexes to provide an indirect load path enabling the bridge to create contact stress on the seal surfaces while allowing a certain amount of compliance to metal tolerances, the cylindrical sealing surfaces 41 of the seals 10A and 10B sealing against the cylindrical walls 59*d* and 59*a* of the wedge 59. The sealing surfaces 31*a*, 32*a* and cylindrical sealing surface 41 of each seal 10A and 10B, in accordance with the invention, are provided with a smooth finish which facilitates their movement against contacting surfaces. Also, because of their composition, the sealing surfaces of the seals 10 are "gall resistant" in that they do not tend to scratch or trade metal with the cooperating surfaces of the metallic members against which they are to seal. If such cooperating surfaces are also provided a smooth finish, it may not be necessary for the actuating force to exceed the yield strength of the seal material to accomplish a seal. However, to seal against roughened surfaces, as in most applications the actuating force must exceed the yield strength for the seal to acquire sufficient plasticity to flow into the crevices and irregularities of the roughened surface.

It is also to be appreciated that the unique seal described herein does not depend on the bridge to aid the seal lips in following the seal surfaces as they deflect due to the applied pressure. The primary function of the bridge is to increase initial contact stresses and to bend with the applied loads at the pressure points. The bridge becomes plasticized with the load pressure. The contact on the sealing surfaces, 32*a*, 31*a* and the sealing surface 41, applies a load to the bridge which bends. The indirect load path enables the bridge to create contact stress on the seal surfaces, while allowing a certain amount of compliance to metal tolerances. With respect to the seal 10A, fluid pressure in the annulus below communicates with the gap between the facing walls of the bridge 20A and the sealing lip 14 whereby forces exerted on the bridge 20A and the lip 14 result in a net force FI exerted by the sealing surface 32a in a radial direction against the wall of the member 52 such that the sealing surface 32a will closely follow the contours and deflecting surface of the cylindrical wall 52a of the member 52 when the seal is energized.

In the event the annulus is pressured above the seals 10A and 10B instead of below, forces are exerted between the tapered walls 42 43 of the seals and the tapered surfaces 59c and 59f of the wedge 59 and between the tops of the seal ring and the retainer rings there above such as are represented in FIG. 4 for the seal 10B by dashed lines on the ring 57 and the wedge 59 and which forces produce a resultant net force F2. The force F2 acts in a radial direction to force the sealing surface 31a of the lip 14b against the wall of the member 51 whereby the lip becomes sufficiently flexible to follow the deflecting surface of the member 51 when the seal 10B is actuated by a wedge ring, or the like, which can move either upwards or downwards. Once pressure is applied, the seal lips become sufficiently flexible to form the deflecting seal surfaces.

With reference to FIG. 5 the seals 10A, 10B are shown as they appear when energized in the condition of establishing fluid tight seals between cylindrical surfaces of the wedge 59 and the metallic member 51 and between the wedge 59 and the metallic member 52. The areas of greatest deformation and radial contact stress occur in the bridge member 20, particularly in the areas thereof which are radially opposite from the lip sealing surface 41 and where the contact stresses are approximately 55,000 p.s.i. In the members 51 and 52 radial contact stresses opposite the sealing surfaces 41, 31a and 32 of the seals 10A, 10B are approximately 30,000 to 35,000 p.s.i.

Figure 6:
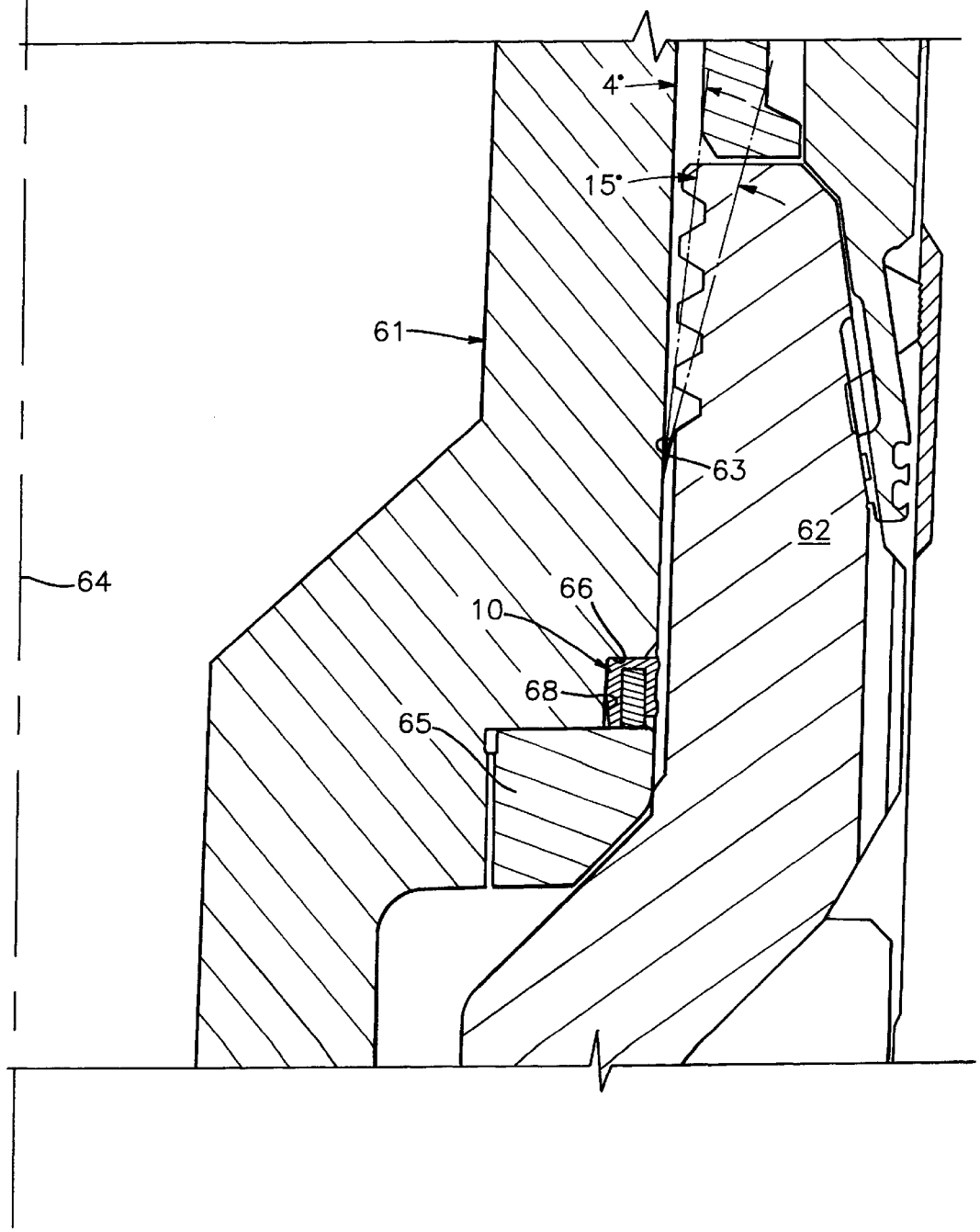
FIG. 6 is a fragmentary view in longitudinal section showing a single seal of the bidirectional seal of the invention istalled to seal the annulus between a tubing hanger and a casing hanger suspended in a wellhead.

In other applications, such as shown in FIG. 6, a single seal 10 may be used to seal against fluid pressure in an annulus, such as between a tubing hanger 61 and a casing hanger 62 fixed in the bore of a wellhead with axial center line 64. In such case, an upwardly facing shoulder 63 with successive tapers, for example of 4° and 15°, may be provided on the wall of the casing hanger. The seal 10 is supported by a support ring 65 fixed in position by a threaded connection or other connecting means to the wall of the tubing hanger 61. When properly positioned, the top of the seal 10 abuts a downward facing shoulder 66 provided by a reduced diameter section of tubing hanger 61. When energized by downward movement of the tubing hanger 61 induced by an appropriate actuating means (not shown), the cylindrical sealing surface 41 of the seal 10 is in sealing engagement with a cylindrical sealing surface 68 provided on the reduced diameter section of tubing hanger 61 and its surfaces 31a, 32a in sealing engagement with the outer surface 69 of the casing hanger 62.

It is to be appreciated therefore that the sealing ring of the present invention significantly differs from conventional metal-to-metal seals. Because of its unique shape and structure, and alloy composition with low modulus of elasticity, it requires approximately half the actuating load to effect a seal than what is required for a typical gasket or other conventional seals. It also does not require radial pre-loading and since it is much shorter in axial length than conventional "U-shape" seals, a much shorter actuating stroke is required. Further advantages are it is more forgiving as to manufacturing tolerances than are conventional metal-to-metal seals and is less expensive to manufacture when considering the less severe machining requirements and its greater tolerance of rough surface finishes on the cooperating structures. In addition, the provision of a metal bridge in the annulus between the concentric sealing lips imparts pliability to the sealing lips than is associated with conventional seals and provides an indirect load path enabling the bridge to create contact stress on the seal surface while allowing deflection in the cooperating surface with which it is to seal.

It is also to be understood that the foregoing description of the invention has been presented for purposes of illustration and explanation and is not intended to limit the invention to the precise structure disclosed herein. For example, it is not a requirement in the seal design of the invention that one of the concentric sealing lips, 12 or 14, be of greater axial length than the other, such that one "leg" of its U-shape radial cross is longer than the other. The sealing lips may be of equal axial length. It is only required that the midline of the cylindrical sealing surface 41 of the "leg" 12 be located in a radial plane which is intermediate the radial planes through the sealing surfaces 31a, 32a of the other sealing "leg" 14 such that the seal 10 does not become, in effect, a "solid" seal ring. Further, the angle of taper for the surfaces 42,43 of the seal 10 and the cooperating shoulder of the actuating wedge ring may be other than 6° and the number of tapered shoulders for interacting with the tapered surface 42 may comprise one or more. Also, the means for actuating the seal may be accomplished by moving the seal ring 10 by hydraulic or mechanical systems as the tapered shoulders of the wedge ring or other cooperating member, are held fixed or vice versa. Also, a variety of metals and alloys might be used for the seal composition so long as it is "gall resistant" and possesses a relatively low modulus of elasticity and yield strength as compared to conventional metal-to-metal seals of steel composition. It is to be appreciated therefore that various material and structural changes may be made by those skilled in the art without departing from the spirit of the invention.

What is claimed is:

1. A bidirectional metallic sealing ring comprising an annular body having a continuous ring base portion with a planar annular end surface and two concentric radially spaced annular sealing lips integrally joined to said base portion in coaxial relation therewith, said annular body having a U-shape in radial cross section whereby a gap is formed between said annular sealing lips, said annular body further having an external cylindrical sealing surface on a first one of said annular sealing lips and a first annular tapered frusto-conical surface extending and diverging outwardly from the end of said base portion to said cylindrical sealing surface and a second annular frusto conical tapered surface extending from said cylindrical sealing surface in a convergent inwardly direction to the free end of said first sealing lip, said annular body further having an external surface on the other of said annular sealing lips, a pair of axially spaced annular flanges projecting from said external surface of the other of said annular sealing lips and located in parallel axially spaced relation to one another such that the axial distance of said cylindrical sealing surface from said base portion is intermediate the axial distances of said annular flanges from said base portion, each said annular flanges having a rounded external surface and an arcuate radial cross section whereby the radial extremity of each said annular flanges provides a sealing surface, said other of said annular sealing lips having a coaxial inner surface with a grooved annular central recessed portion and axially spaced annular cylindrical end portions with a notch provided in one of said annular cylindrical end surface portions extending from the free end of said other sealing lip for the axial length thereof and communicating with the groove provided by said central recessed portion, and an annular metallic bridge member with cylindrical side walls inserted within said gap formed between said annular sealing lips and having a planar end wall in abutting relation to said continuous ring base portion.

2. A sealing ring as set forth in claim 1 wherein the annular sealing lip having said annular cylindrical sealing surface is of greater axial length than the other of said annular sealing lips.

3. A sealing ring as set forth in claim 1 wherein said annular body member and said bridge member are of a composition with a relatively low modulus of elasticity and yield strength.

4. A sealing ring as set forth in claim 3 wherein said annular body member and bridge member are of a nickel-aluminum-bronze alloy.

5. A metallic sealing ring as set forth in claim 1 wherein said bridge member is provided with a flexible annular beveled surface connecting its cylindrical side wall and the planar end wall which abuts said continuous ring base portion.

6. The bidirectional metal sealing ring of claim 1, wherein the annular metal bridge member has at least three sealing surfaces, and is capable of receiving loads from said at least three sealing surfaces, then plasticizing between the loads to provide an indirect load path while creating contact stress on the sealing surfaces while allowing compliance to metal tolerances.

7. The bidirectional metallic sealing ring of claim 6 wherein said sealing surfaces are adapted to be impacted from a first load parallel to the centerline of the seal and a second load parallel to the centerline of the seal from the opposite direction and thereby creating contact stress on the sealing surfaces.

8. The bidirectional metallic sealing ring of claim 7 wherein the at least three sealing surfaces, are positioned to provide non-aligned pressure points on the sealing surfaces in different radial planes relative to the axis of the sealing ring.

9. The bidirectional metallic sealing ring of claim 1, said sealing ring sealing against fluid pressure arising in an annulus formed between the facing cylindrical surfaces of an outer metallic member and an inner metallic member, said inner metallic member being disposed concentrically within said outer metallic member, when said sealing ring is disposed in such an annulus.

10. A bidirectional metallic sealing ring for sealing against fluid pressure arising in an annulus formed between the facing cylindrical surfaces of an outer metallic member and an inner metallic member, said inner metallic member being disposed concentrically within said outer metallic member, said sealing ring comprising an annular body and an annular metallic flexible bridge member, said annular body further comprising:

a continuous ring base portion, first and second concentric radially spaced annular lips integrally joined to said base portion in coaxial relation therewith such that a gap is formed between said annular sealing lips, whereby said annular body has a U-shape in radial cross section, said first annular sealing lip having an external cylindrical sealing surface and a pair of frusto-conical surfaces extending and diverging outwardly from said external cylindrical sealing surface;

said second annular sealing lip having an external surface, a pair of axially spaced annular flanges projecting from said external surface and located in parallel axially spaced relation to one another such that the axial distance of said cylindrical sealing surface from said base portion is intermediate the axial distances of said annular flanges from said base portion, each of said annular flanges having a rounded external surface and an annular radial extremity which provides an annular sealing surface, a free end distal from said base portion, an inner surface with a coaxial annular central recess and axially spaced annular cylindrical end portions separated by said recess and a notch in the annular cylindrical end surface extending from said free end to communicate with said recess;

said annular metallic flexible bridge member having a cylindrical side wall and two end walls, said bridge member being inserted within said gap formed between said first and second annular sealing lips such that one of its end walls is in abutting relation to said base portion and its side wall is in abutting relation to the inner surfaces of said first and second annular sealing lips, wherein, said sealing ring is capable of sealing against fluid pressure by means of at least three pressure points and said flexible bridge member.

11. The bidirectional metal sealing ring of claim 10, wherein the annular metal bridge member has at least three sealing surfaces, and is capable of receiving loads from said at least three sealing surfaces, then plasticizing between the loads to provide an indirect load path while creating contact stress on the sealing surfaces while allowing compliance to metal tolerances.

12. The bidirectional metallic sealing ring of claim 11, wherein said sealing surfaces are adapted to be impacted from a first load parallel to the centerline of the seal and a second load parallel to the centerline of the seal from the opposite direction and thereby causing creation of contact stress on the sealing surfaces.

13. The bidirectional metallic sealing ring of claim 12 wherein the at least three sealing surfaces, are positioned to provide non-aligned pressure points on the sealing surfaces, in different radial planes relative to the axis of the sealing ring.

14. A method for seal against the flow of pressurized fluid in a wellhead annulus found between an outer member having a concave sealing surface and an inner member having a convex sealing surface, comprising the steps of using a sealing ring having an annular body with a continuous ring base portion and two concentric radially spaced annular sealing lips integrally joined to said base portion in coaxial relation therewith whereby said annular body is of U-shape in radial cross section, wherein said annular body further having on one of said annular sealing lips an outer cylindrical sealing surface adapted to engage the sealing surface of one of said annulus forming members and a pair of tapered frusto-conical surfaces extending and diverging outwardly from said base portion and the free end of said one of said sealing lips to said cylindrical sealing surface, said other sealing lip having a pair of axially spaced annular flanges projecting from the external surface thereof and located in parallel axially spaced relation to one another such that the axial distance of said cylindrical sealing surface from said base portion is intermediate the axial distances of said annular flanges from said base portion, each said projecting annular flange having an annular radial extremity which provides a sealing surface adapted to engage the sealing surface of the other said annulus forming member, said other of said annular sealing lips having an inner surface with a coaxial annular central recess and axially spaced annular cylindrical end portions separated by said recess and having a notch in the annular cylindrical end surface extending from said free end of said other sealing lip to communicate with said recess; and using a flexible annular metallic bridge member with a cylindrical side wall inserted in the gap between said radially spaced sealing lips and with one of its end walls in abutting relation to said continuous ring base portion, and its cylindrical side wall in abutting relation to the inner surfaces of said sealing lips, wherein one of said annulus forming members having a tapered shoulder adapted to cammingly engage one of said tapered frusto-conical surfaces on one of said sealing lips; and actuating the sealing ring to seal said annulus by driving said tapered shoulder and said one tapered frusto-conical surface into camming engagement while said sealing ring is retained by the other said annulus forming member whereby said ring is positioned and energized with its sealing surfaces in sealing engagement with the sealing surfaces on said annulus forming members.

15. A method for sealing against pressurized fluid in a wellhead annulus found between an outer member having a concave sealing surface and an inner member having a convex sealing surface, said wellhead annulus having an inner diameter formed between the concave sealing surface and the convex sealing surface, comprising the steps of:

(a) disposing a sealing ring within said wellhead annulus, said sealing ring comprising;

(1) an annular body having a continuous ring base portion and first and second concentric spaced annular sealing lips integrally joined to said base portion, said first annular sealing lip having an exterior surface with a first sealing surface and said second annular sealing lip having an exterior surface with second and third sealing surfaces, each of said first and second annular sealing lips having an inner surface such that a gap is formed between said inner surfaces of said first and second annular sealing lips, said annular body having a U-shape in radial cross section, and (2) an annular bridge member having a cylindrical side wall and two end walls, said bridge member being inserted within said gap formed between said first and second annular sealing lips such that one of its end walls is in abutting relation to said base portion and its side wall is in abutting relation to said base portion and its side wall is in abutting relation to the inner surfaces of said first and second annular sealing lips;

said sealing ring disposed within the wellhead annulus in such a manner that said first, second and third sealing surfaces are in contact with the inner diameter of the wellhead annulus, and (b) loading said first, second and third sealing surfaces, thereby plastically deforming said bridge member to create stress on said first, second and third sealing surfaces and to provide an indirect load path while creating stress on said first, second and third sealing surfaces, wherein the loading occurs from either a first direction which is parallel to the center line of the sealing ring, or a second direction which is opposite the first direction and which is parallel to the centerline of the sealing ring.

* * * * *

UNITED STATES PATENT AND TRADEMARK OFFICE
CERTIFICATE OF CORRECTION

PATENT NO. : 6,164,663
DATED : December 26, 2000
INVENTOR(S) : Turner

Page 1 of 1

It is certified that error appears in the above-identified patent and that said Letters Patent is hereby corrected as shown below:

<u>Title page,</u>
Item [73], please delete "Kvaetner", and insert -- Kvaerner -- therefore.

Signed and Sealed this

Fifteenth Day of January, 2002

Attest:

Attesting Officer

JAMES E. ROGAN
Director of the United States Patent and Trademark Office